United States Patent
Helms et al.

(10) Patent No.: US 10,531,229 B2
(45) Date of Patent: Jan. 7, 2020

(54) WIRELESS LOCATOR SYSTEM

(71) Applicant: Radius Networks Inc., Washington, DC (US)

(72) Inventors: David Helms, Arlington, VA (US);
Marc Wallace, Arlington, VA (US);
Scott Yoder, Washington, DC (US);
Francis Nguyen, Chicago, IL (US)

(73) Assignee: Radius Networks Inc., Washington, DC (US)

( * ) Notice: Subject to any disclaimer, the term of this patent is extended or adjusted under 35 U.S.C. 154(b) by 0 days.

(21) Appl. No.: 15/884,132

(22) Filed: Jan. 30, 2018

(65) Prior Publication Data

US 2018/0220265 A1    Aug. 2, 2018

Related U.S. Application Data

(60) Provisional application No. 62/453,872, filed on Feb. 2, 2017.

(51) Int. Cl.
| | |
|---|---|
| *H04W 68/00* | (2009.01) |
| *H04W 4/02* | (2018.01) |
| *H04W 24/10* | (2009.01) |
| *H04W 4/021* | (2018.01) |

(52) U.S. Cl.
CPC ............ *H04W 4/023* (2013.01); *H04W 24/10* (2013.01); *H04W 4/021* (2013.01)

(58) Field of Classification Search
CPC ...... H04W 4/023; H04W 24/10; H04W 4/021
See application file for complete search history.

(56) References Cited

U.S. PATENT DOCUMENTS

| | | | |
|---|---|---|---|
| 8,326,260 B1 | 12/2012 | Bradish et al. | |
| 8,989,094 B2 | 3/2015 | Bradish et al. | |
| 9,408,060 B2 | 8/2016 | Helms et al. | |
| 2005/0049940 A1* | 3/2005 | Tengler | G06Q 10/087 705/21 |
| 2005/0204061 A1* | 9/2005 | Farchmin | G05B 19/0423 709/245 |
| 2013/0080218 A1 | 3/2013 | Wildern, IV et al. | |
| 2014/0274136 A1* | 9/2014 | Edge | H04W 4/04 455/456.2 |
| 2015/0186941 A1 | 7/2015 | Anthony et al. | |
| 2017/0083893 A1* | 3/2017 | Beyer | G06Q 20/209 |
| 2017/0265046 A1* | 9/2017 | Chen | H04W 4/08 |
| 2018/0048996 A1* | 2/2018 | Ciecko | H04W 4/021 |
| 2018/0075518 A1* | 3/2018 | Werbitt | H04L 67/12 |

FOREIGN PATENT DOCUMENTS

WO    2015042065 A1    3/2015

OTHER PUBLICATIONS

International Preliminary Report and Written Opinion dated Aug. 6, 2019, in PCT Patent Application No. PCT/US2018/016336, 10 pages.

* cited by examiner

*Primary Examiner* — Barry W Taylor
(74) *Attorney, Agent, or Firm* — Vierra Magen Marcus LLP

(57) ABSTRACT

The disclosure relates to technology for determining a location of a user in a physical venue, the method comprising receiving, at a central processor, a signal from a wireless transmitter in the user's possession, the signal containing an encoded message and additional metadata, determining a location of the wireless transmitter in the physical venue based on the encoded message and the additional metadata, and outputting the location.

26 Claims, 9 Drawing Sheets

WIRELESS LOCATOR SYSTEM

CLAIM FOR PRIORITY

This application claims the benefit of priority to U.S. Provisional Application No. 62/453,872, filed Feb. 2, 2017, the entire contents of which are hereby incorporated by reference.

BACKGROUND

The market for wireless location monitoring systems is large and growing, but current applications of the technology can nevertheless be inconvenient to use. Existing wireless location monitoring systems generally use short range wireless technologies. Further, they operate by detecting nearby radio tags embedded in seating, tables, racks, or other furniture in the retail environment. These wireless locator devices relay the identifying information for the detected tag or tags to a correlating central processor to provide customer location information.

This known approach involving the use of radio tags leads to several shortcomings. For example, the wireless locator device must be intentionally placed by a customer within a very short distance, approximately one inch, from the radio tag. If the customer is not aware of this requirement, the location tracking solution does not function properly and locating the customer becomes very difficult. Also, it is increasingly common to find retail locations equipped with movable seating, tables, product racks, and other movable furniture. As this furniture is moved around in the venue, it becomes increasingly difficult to determine the customer's location based on the detection of the furniture's embedded radio tag.

BRIEF SUMMARY

In one embodiment, there is a method for determining a location of a user in a physical venue, the method comprising receiving a signal from a wireless transmitter in the user's possession, the signal containing an encoded message and additional metadata, determining a location of the wireless transmitter in the physical venue based on the encoded message and the additional metadata, and outputting the location.

In another embodiment, there is a device for determining a location of a user in a physical venue, comprising a non-transitory memory storage comprising instructions and one or more processors in communication with the memory, wherein the one or more processors execute the instructions to: receive a signal from a wireless transmitter in the user's possession, the signal containing an encoded message and additional metadata, determine a location of the wireless transmitter in the physical venue based on the encoded message and the additional metadata, and output the location.

In still another embodiment, there is a non-transitory computer-readable medium storing computer instructions for determining a location of a user in a physical venue, that when executed by one or more processors, cause the one or more processors to perform the steps of: receive a signal from a wireless transmitter in the user's possession, the signal containing an encoded message and additional metadata, determine a location of the wireless transmitter in the physical venue based on the encoded message and the additional metadata, and output the location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

The disclosure relates to using wireless network technology to locate a user. More specifically, the disclosure relates to technology involving the use of wireless transmitters, wireless receivers and a correlating central processor to determine a location of a user in a physical venue, such as a restaurant.

In an embodiment, the present technology determines the location of the user in order to deliver a product or a service to the user at the user's location. Being able to efficiently locate and make a delivery to a user in this manner increases the user's perception of the level of service and convenience provided by the physical venue.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Figure 1:
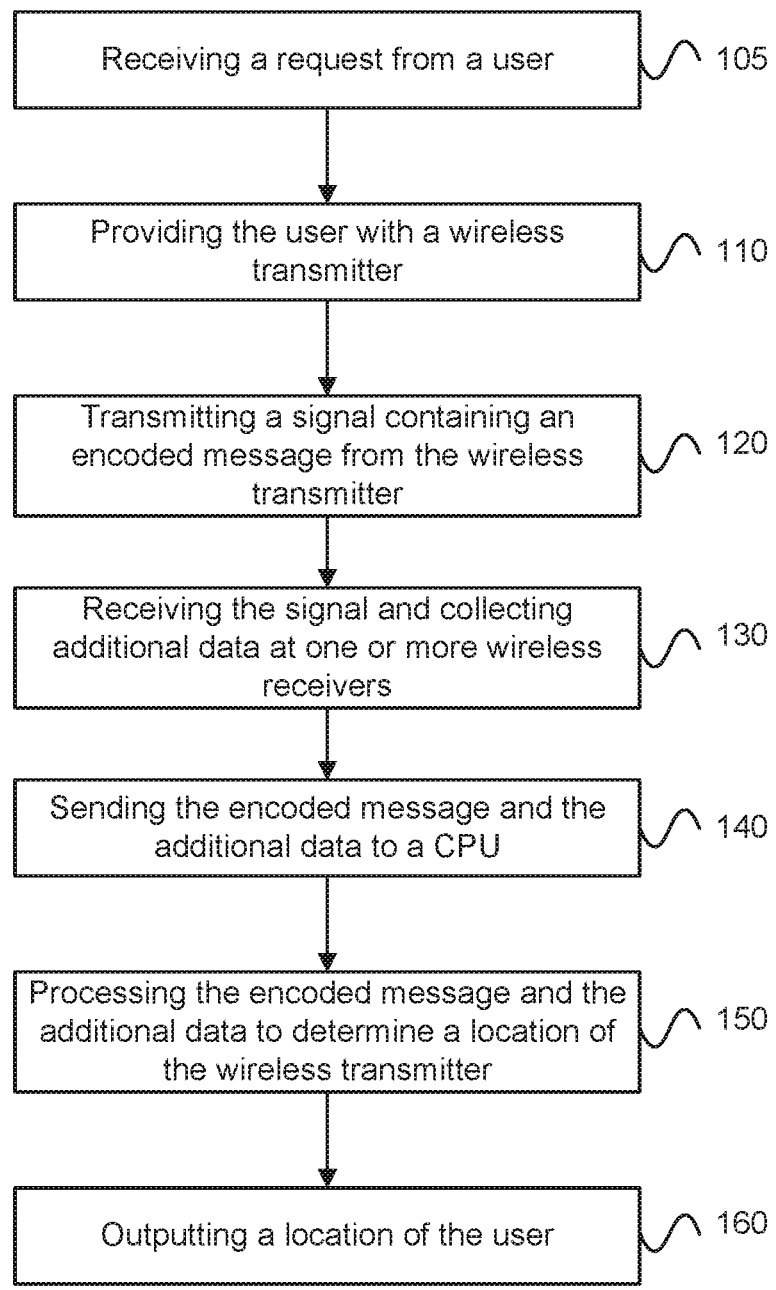
FIG. 1 illustrates an embodiment of the present technology, showing a flowchart of a method for determining a location of a user using a wireless network.
Figure 2:
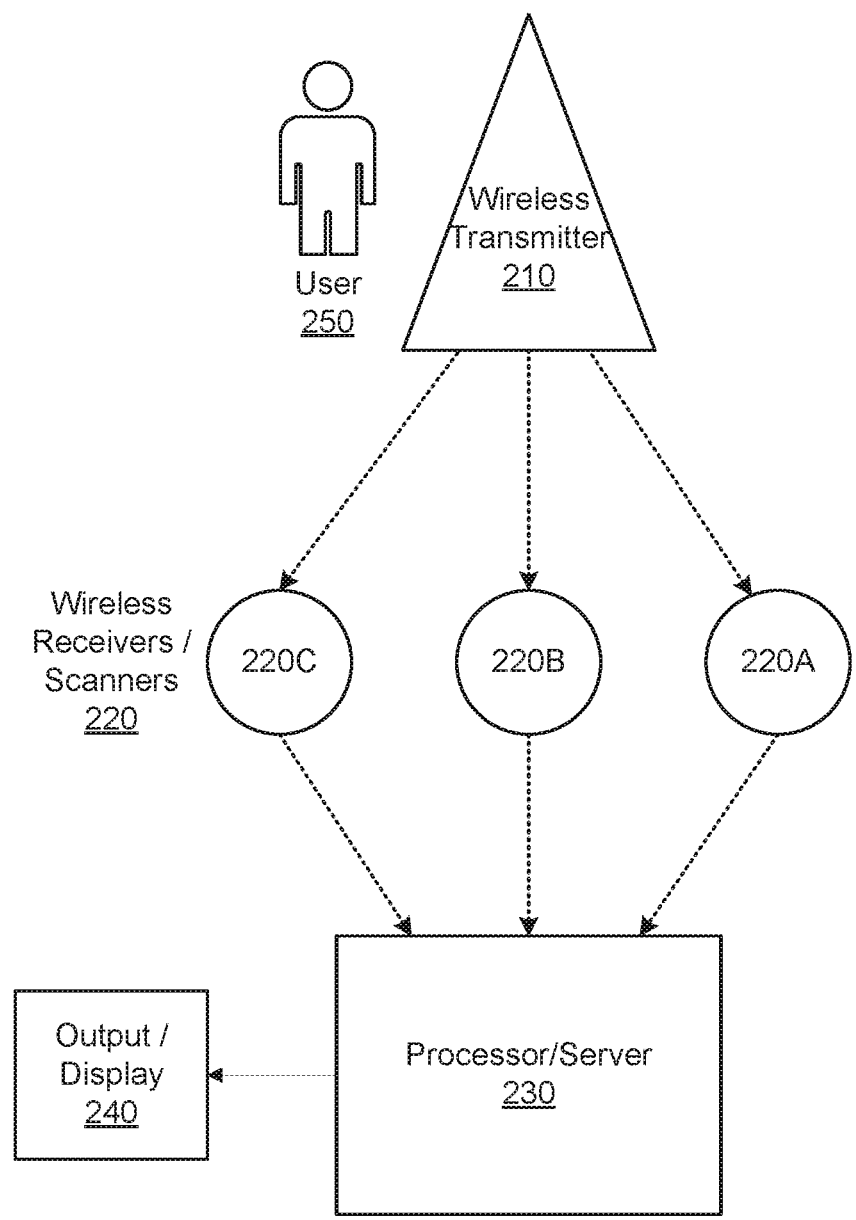
FIG. 2 illustrates an embodiment of the present technology, showing a block diagram of a system for determining a location of a user using a wireless beacon.

FIG. 1 illustrates a method 100 for locating a user in a physical venue. FIG. 2 illustrates a system 200 for locating a user 250 using a wireless beacon 210. The following disclosure will reference both FIG. 1 and FIG. 2. The wireless beacon, transmitters, notifications and advertisements disclosed in the various embodiments of this disclosure are discussed in U.S. Pat. Nos. 8,326,260; 8,989,094 and 9,408,060 and U.S. Patent Publication No. 20150186941, the contents of which are hereby incorporated by reference.

At step 105, the system 200 receives a request, initiated by a user 250, for a product or a service. In one embodiment, a customer at a restaurant may place an order with a waiter for a food item to be delivered to the customer's table. In an alternative embodiment, the order may be submitted electronically. For example, the customer may use the wireless transmitter 210 depicted in FIG. 2 to submit a request that may be picked up by a wireless receiver 220 and ultimately sent to the processor (server) 230 for processing. The request may be submitted while the user 250 is inside the physical venue, or may be submitted remotely in advance of the user's 250 arrival at the physical venue.

At step 110, a wireless transmitter 210 is provided to the user 250 and remains in the user's 250 possession as they move throughout the venue at their convenience. In one embodiment, the wireless transmitter 210 may be a wireless beacon or a table tent, but may also take on the form of other devices capable of wireless transmission in alternative embodiments; it is understood that any wireless transmitter known in the art may be used as the wireless transmitter 210 as depicted in FIG. 2.

At step 120, the wireless transmitter 210 transmits a signal containing an encoded message. In one embodiment, the wireless transmitter 210 may transmit the signal constantly. In one embodiment, the message may be broadcasted at regular predetermined time intervals, such as once every 0.2 seconds. It is understood that other time intervals and frequencies may be used in alternative embodiments. The encoded message may include a unique identifier. It is understood that the unique identifier may be in any format, such as a number, a string, a combination of numbers and strings, or any other suitable format.

At step 130, the encoded message, having the unique identifier, is received by one or more wireless receivers 220A, 220B, 220C installed around the venue. In one embodiment, the encoded message may be received by all three receivers 220A, 22B, and 220C. In addition to receiving the encoded message, the one or more wireless receivers 220 may also collect additional metadata about the signal and the encoded message by analyzing the received signal containing the encoded message that was broadcasted by the wireless transmitter 210. The additional metadata may include location data regarding a location of the user 250, and signal strength information regarding the strength of the signal sent from the wireless transmitter 210 to the one or more wireless receivers 220.

In one embodiment, the additional metadata, such as location data, may be generated by the wireless transmitter 210 when it generated the signal containing the encoded message. For example, the wireless transmitter 210 may contain a location-tracking device, such as a GPS device, that may continuously track the location of the wireless transmitter 210. The wireless transmitter 210 may extract data containing a location of the wireless transmitter 210 from the location-tracking device and embed a copy of the location data in the signal that it broadcasts. When the signal is received by the one or more wireless receivers 220, the wireless receivers 220 may then extract the location data from the signal. Alternatively, in other embodiments, the wireless receivers may also directly extract the additional metadata, such as signal strength information, directly from the signal itself. For example, the wireless receiver 220 may directly measure the strength of the received signal. In other embodiments, the wireless receivers 220 may also generate the additional metadata, such as a timestamp. For example, a wireless receiver 220 may generate a timestamp associated with when the broadcasted signal is received. A timestamp for a signal may also be generated by a wireless transmitter 210 when it broadcasts the signal. It is understood that any combination of the above-mentioned approaches may be used to collect the additional metadata in step 130 according to embodiments of the present technology. In addition, step 130 is also not limited to the above-mentioned approaches of collecting the additional metadata, and may apply to other methods for collecting information from a received signal in beyond the encoded message of the received signal.

At step 140, the encoded message having the unique identifier, along with the additional metadata, is sent to a correlating processor 230. At step 150, the processor 230 processes the received encoded message having the unique identifier and the additional metadata collected to determine a location of the wireless transmitter 210 and the user 250. In one embodiment, the location of the user 250 in the venue may be determined by identifying which wireless receivers 220 have received the wireless transmitter's 210 encoded message and comparing the time and signal strength of each received message.

For example, according to one embodiment, three wireless receivers 220 may have received the wireless transmitter's 210 signal. A first wireless receiver may report a signal strength of 80%, a second wireless receiver 220 may report a signal strength of 60% and a third wireless receiver may also report a signal strength of 60%. The signal strength information is then added to the metadata of the signal and sent to the processor 230 for analysis. The processor 230 may have, in its memory, a map representation of the physical venue. In additional, the processor 230 may also know the locations of the three wireless receivers in the physical venue as well as in the map representation. Based on the signal strength information in the signal's metadata, the processor 230 may determine how far the wireless transmitter 210 is from each of the wireless receivers and therefore triangulate a single location for the wireless transmitter 210.

At step 160, when the user's 250 request for a product or service is ready to be fulfilled, such as when a restaurant has finished preparing a customer's ordered food item, the user's 250 location information may be outputted and provided to an agent, such as a restaurant waiter. This location information may be outputted through a physical display 240, an order receipt, or any other relevant means of human-computer communication and known in the art. For example, system may print out a table number indicating the location where a user is sitting on an order receipt. The agent may then proceed to the user's 250 location in the venue to fulfill the user's request or perform any other relevant tasks. For example, the agent may be delivering a product or a service, such as an ordered food item, to the user 250 at the user's 250 current location in the venue.

Figure 3:
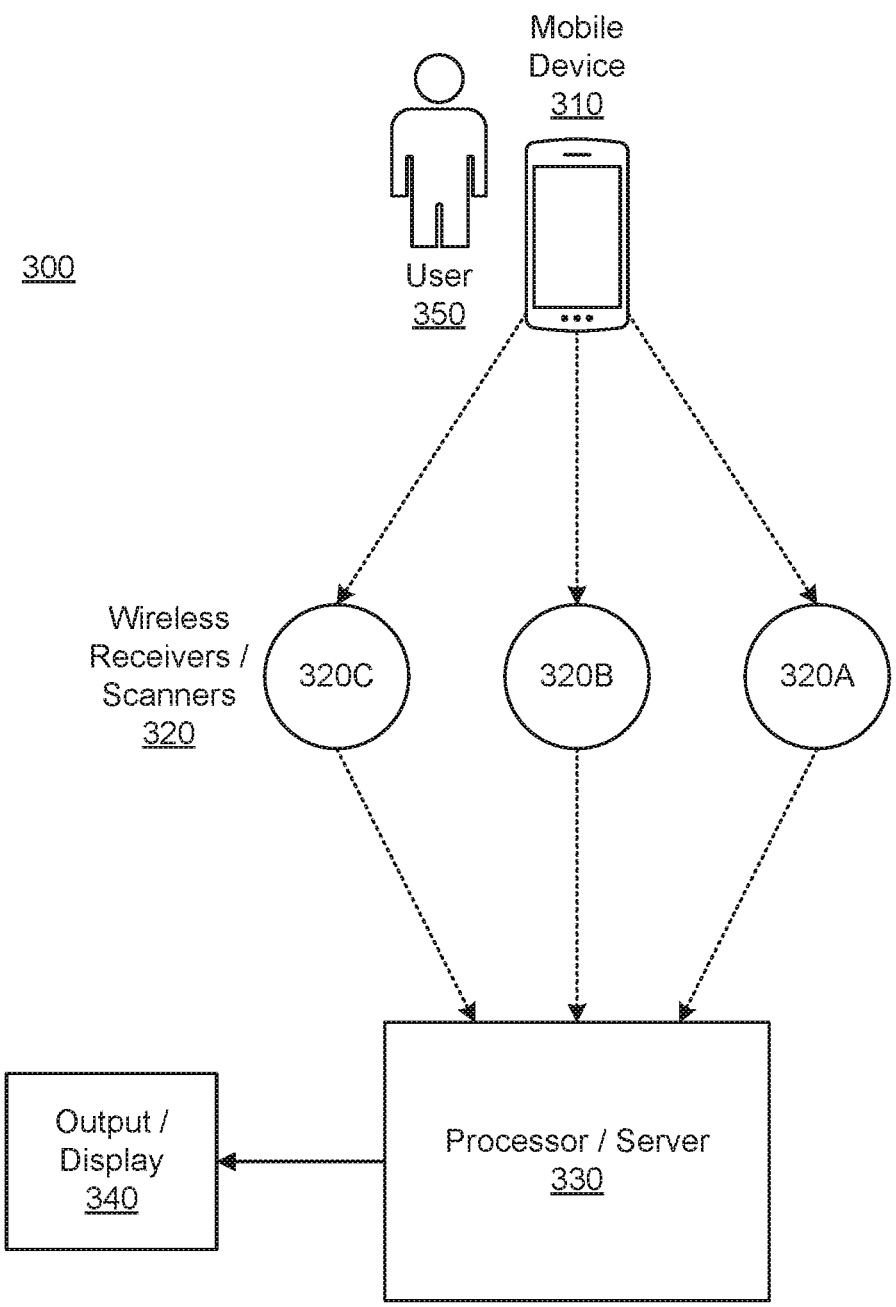
FIG. 3 illustrates an embodiment of the present technology, showing a block diagram of a system for determining a location of a user using a mobile device.

FIG. 3 illustrates another embodiment of the present technology, showing a block diagram of a system 300 that makes use of a user's 350 mobile phone 310, rather than a standalone wireless transmitter 210 or a table tent, to perform the functions of the wireless transmitter 210 from the system 200 in FIG. 2. In FIG. 3, the user 350 uses his or her mobile device 310, to transmit an encoded message with a unique identifier, along with the additional metadata including time sent and signal strength, to one or more wireless receivers 320. In one embodiment, the mobile device 310 may contain software that transmits the encoded information to the wireless receiver(s) 320A-320C, and the encoded information is sent to the correlating central processor 330. The information is processed and once the user 350 location is known, that information is outputted to a display 340 or any other output format. The method used with respect to the embodiment in FIG. 3 is similar to the method described in FIG. 1 and FIG. 2. However, instead of using a wireless transmitter 210, a mobile device 310 is used.

Figure 4:
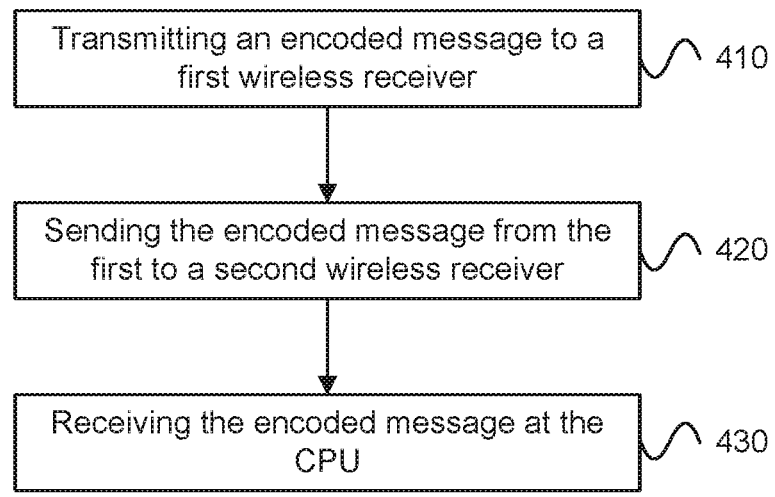
FIG. 4 illustrates an embodiment of the present technology, showing a flowchart of a method for determining a location of a user using a mesh network.
Figure 5:
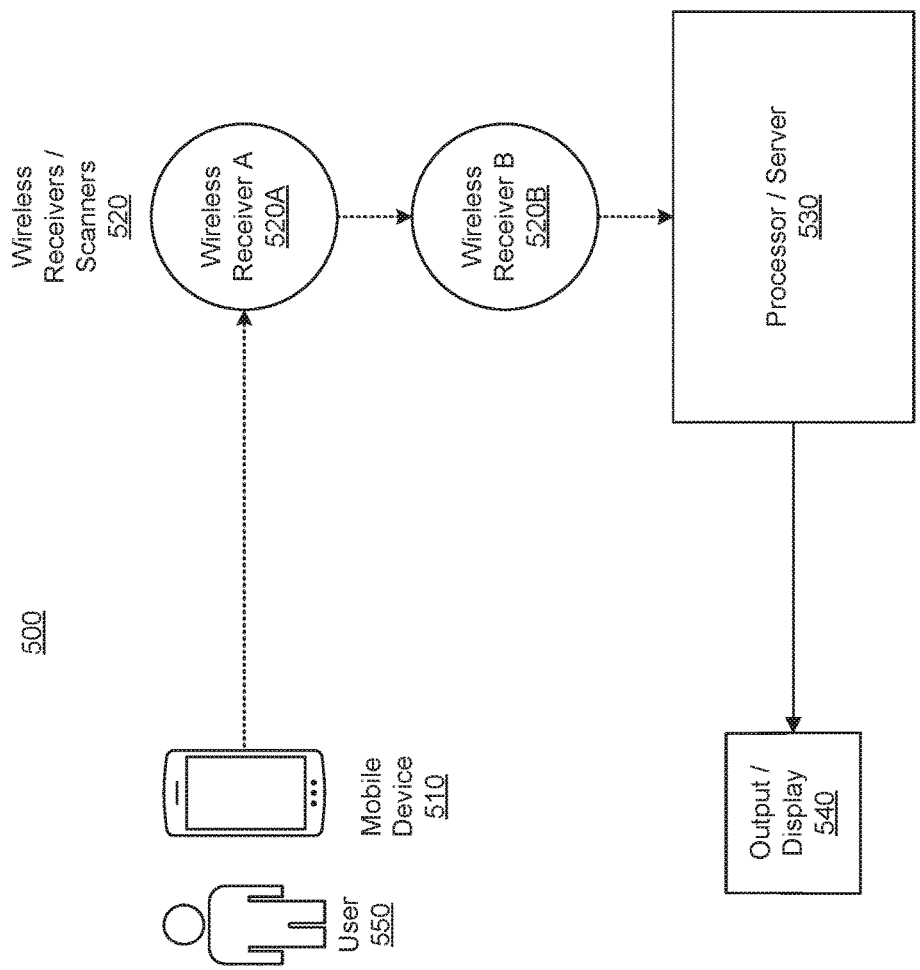
FIG. 5 illustrates an embodiment of the present technology, showing a block diagram of a system for determining a location of a user using a mesh network.

FIG. 4 illustrates another embodiment of the present technology, showing a flowchart of a method 400 for receiving a signal from a wireless transmitter and relaying the signal to a central processor using a mesh network. FIG. 5 illustrates another embodiment of the present technology, showing a block diagram of a system 500 that uses a mesh network having one or more wireless receivers 520 to receive signals from a wireless transmitter 510 and relay those signals to a central processor 530. The following disclosure makes reference to both FIG. 4 and FIG. 5. In a traditional mesh network, data signals will generally hop from one network device, such as a wireless receiver 520, to another, until the signals reach their destination. In one embodiment, the wireless receivers 520 may communicate with each other to ensure that the signals received from the wireless transmitter 510 at one wireless receiver 520 may be passed along to the final destination at the central processor 530 via a mesh network of wireless receivers 520. Dynamic routing algorithms may be implemented at each wireless receiver 520 to route data from an originating device to a destination device.

According to an embodiment, steps 410 to 430 of the method 400 in FIG. 4 that makes use of a mesh network may replace steps 120 to 140 in FIG. 1. In some embodiments, wireless receivers 520A to 520B may be combined to relay information about a wireless transmitter 510 using a mesh network approach found in system 500 as depicted in FIG. 5. At step 410, a wireless transmitter 510 transmits a signal containing an encoded message to a first wireless receiver A 520A. The wireless transmitter 510 may be a user mobile device or any other wireless transmitter known in the art. At step 420, the signal containing the encoded message is then sent to a second wireless receiver B 520B within range. At step 530, the second wireless receiver B 520B may send the encoded message to the central processing unit 530. The central processing unit 530 may then process the signal containing the encoded message, including the unique identifier within the encoded message as well as additional metadata contained within the signal such as user location and signal strength, and output the user location on an output medium 540 such as a display. The steps performed by the central processor 530 are described in FIG. 1 and FIG. 2 as previously discussed.

Figure 6:
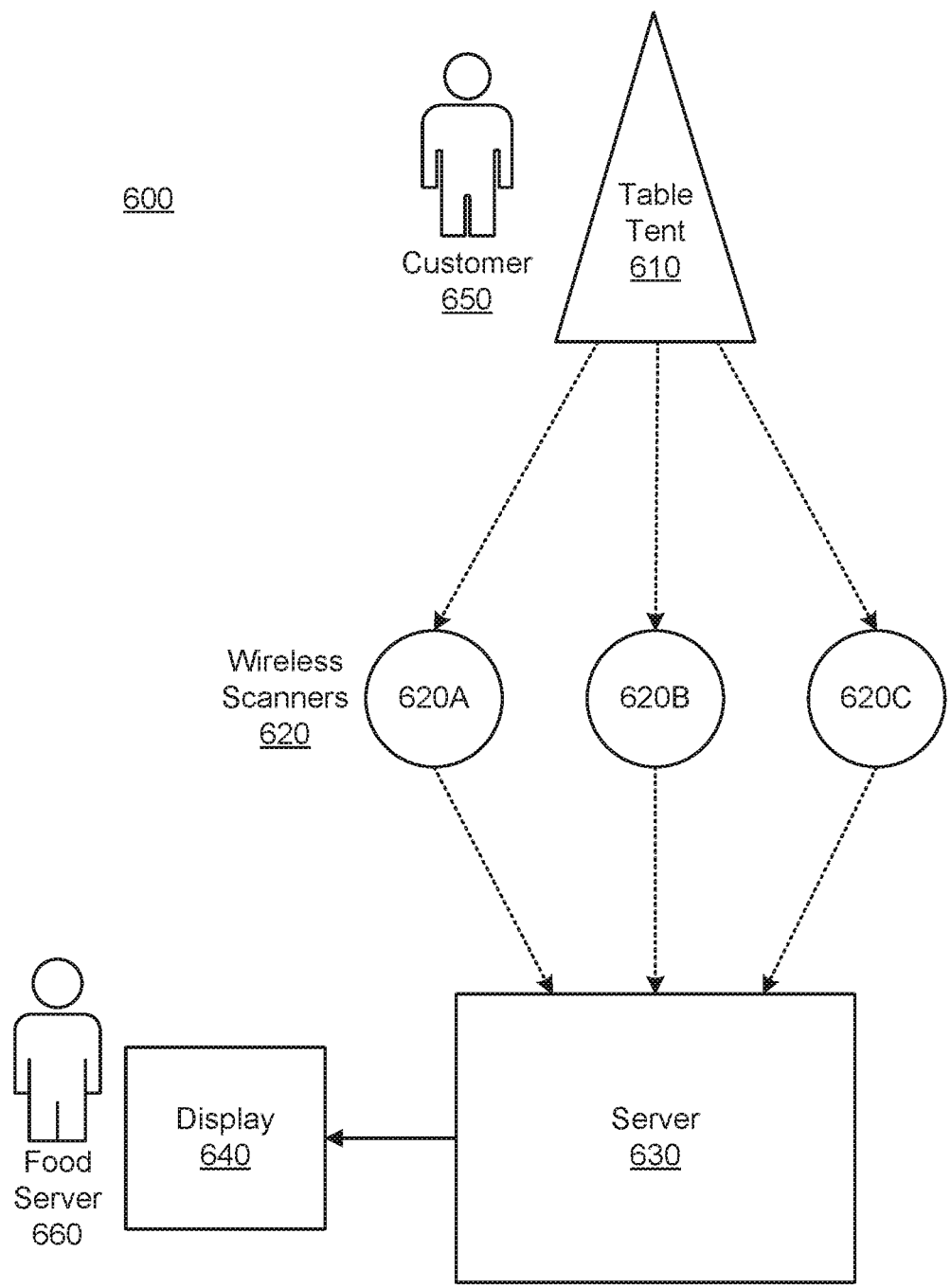
FIG. 6 illustrates an embodiment of the present technology, showing a block diagram of a system for determining a location of a user using a wireless beacon in the form of a table tent.

FIG. 6 illustrates another embodiment wherein the system 600 is implemented in a restaurant setting. This embodiment is an exemplary embodiment of the present technology and should not be construed as limiting the subject matter or scope of the disclosure. In one embodiment, the system 600 may be used to track and monitor a customer's 650 location in a restaurant environment. This embodiment aids and expedites the delivery of food to a customer at a table of their choosing when their food order is prepared and ready to be served.

In one embodiment, the customer 650 places an order for a food item at a restaurant counter or via a kiosk. The customer 650 is provided with a wireless transmitter 610 in the form of a table tent with an embedded radio transmitter that is beacon-enabled. The table tent 610 may be powered with battery-powered BLE beacons. The table tent 610 is branded with an external label, such as a unique identifying number. In one embodiment, the customer 650 may also input the unique identifying number associated with the provided table tent 610 as part of the customer's 650 order made at the counter or kiosk. The table tent 610 repeatedly transmits a signal to the wireless receivers or scanners 620A to 620C. The signal contains an encoded message that is unique and representative of the identifying number on the external label of the table tent 610. The wireless receivers 620A to 620C may be, but are not limited to, BLE antennas installed above the ceiling of the restaurant venue that may further connect to the server 630 via network cables. The customer 650 may carry the table tent 610 with them to any location in the restaurant, such as a seating location of their choosing.

When the customer's 650 food order is prepared and ready for delivery, a food server 660 is provided with the customer's current location in the restaurant through a visual display 640 or with the location printed on the customer's order receipt 640. The food server 660 is dispatched to the customer's 650 location in the restaurant with the food. As the food server 660 approaches the customer 650, the food server 660 can visually confirm the customer's 650 identity and location based on the corresponding identifying number on the table tent 610 external label. The food server 660 delivers the food to the customer 650, providing an increased level of service and convenience to the customer 650.

Figure 7:
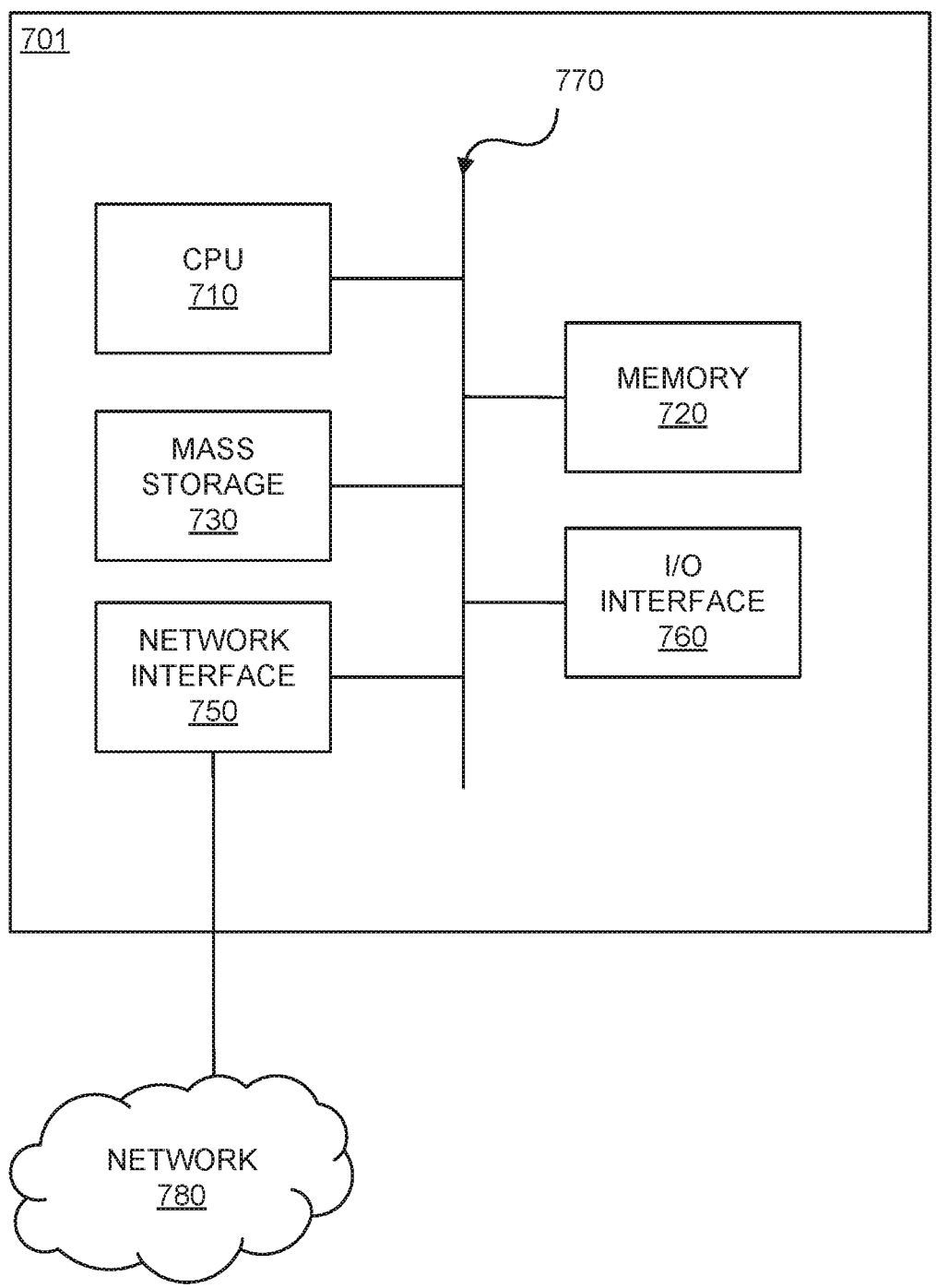
FIG. 7 illustrates a block diagram of an exemplary network computing system that may be used to implement various embodiments.

FIG. 7 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 701 equipped with one or more input/output devices, such as network interfaces, storage interfaces, and the like. The processing unit 1201 may include a central processing unit (CPU) 710, a memory 720, a mass storage device 730, and an I/O interface 760 connected to a bus. The bus may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The mass storage device 730 may comprise any type of storage device configured to store data, programs, and other information and to make the data, programs, and other information accessible via the bus. The mass storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

Figure 8:
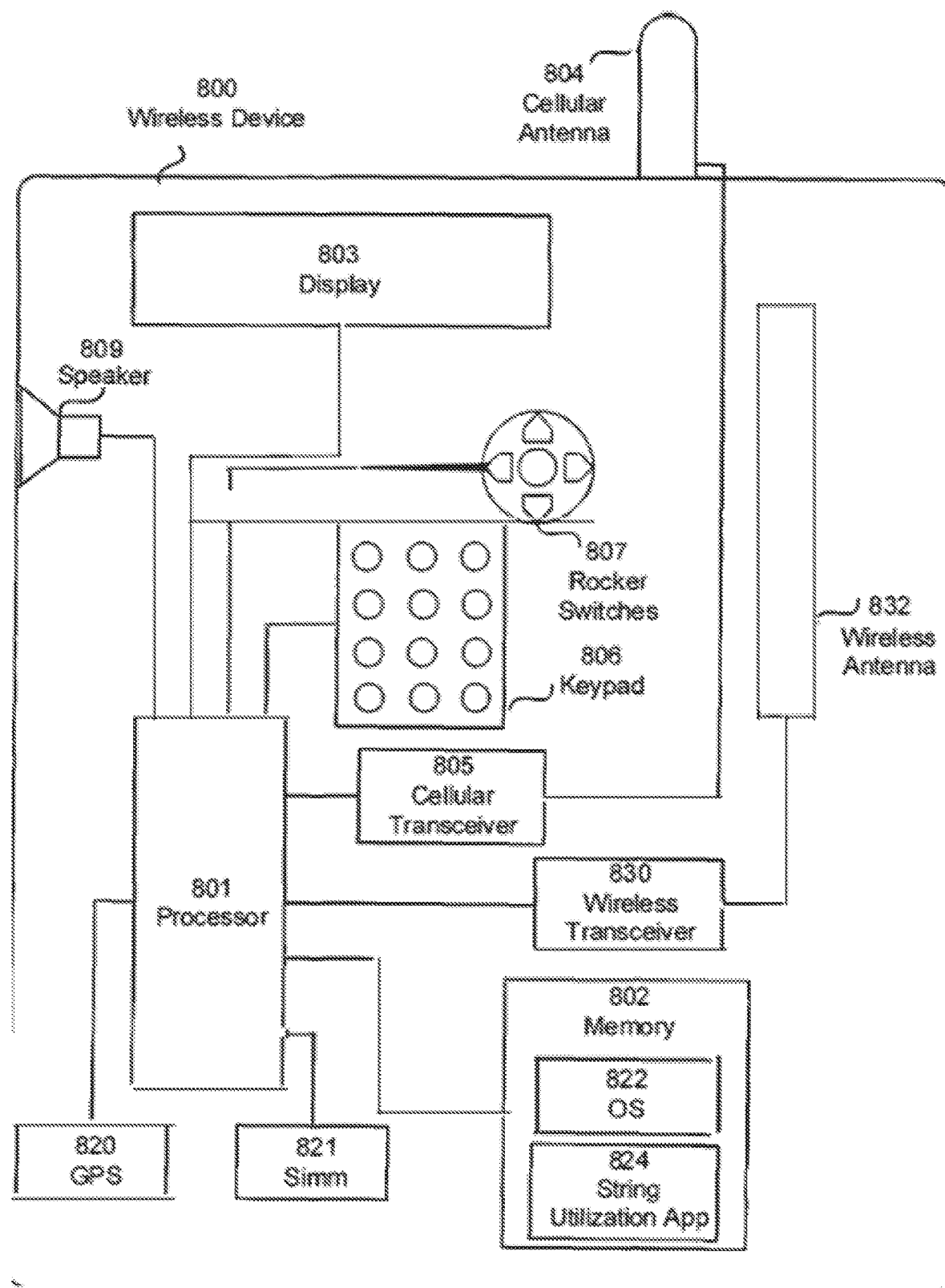
FIG. 8 illustrates an exemplary wireless device that may be used to implement various embodiments.

FIG. 8 illustrates an exemplary wireless device that may be used to implement various embodiments. For example, the wireless device 800 may be used as the wireless transmitter 210 or wireless receivers 220 depicted in FIG. 2.

A wireless device 800 may include a processor 801 coupled to an internal memory 802, to a display 803 and to a SIMM 821 or similar removable memory unit. Additionally, the wireless station 800 may optionally have a cellular antenna 804 for sending and receiving electromagnetic radiation that is connected to a cellular transceiver 805 coupled to the processor 801. In some implementations, the transceiver 805 and portions of the processor 801 and memory 802 may be used for multi-network communications. The wireless device 800 may also include a key pad 806 or miniature keyboard and menu selection buttons or rocker switches 807 for receiving user inputs. The wireless device 800 may also include a GPS navigation device 820 coupled to the processor and used to determine the location coordinates of the wireless device 800. Additionally, the display 803 may be a touch sensitive device that may be configured to receive user inputs.

A wireless transceiver 830 provides wireless communications via wireless antenna 832. By way of illustration and not by way of limitation, the wireless transceiver may be compliant with 802.11x standards.

The processor 801 may be any programmable microprocessor, microcomputer or multiple processor chip or chips that can be configured by software instructions (applications) to perform a variety of functions, including the functions of the various embodiments described herein. In an embodiment, the wireless device 800 may include multiple processors 801, such as one processor dedicated to cellular and/or wireless communication functions and one processor dedicated to running other applications.

Typically, software applications may be stored in the internal memory 802 before they are accessed and loaded into the processor 801. For example, the internal memory 802 may include string utilization application 824. In an embodiment, the processor 801 may include or have access to an internal memory 802 sufficient to store the application software instructions. The memory may also include an operating system 822.

The internal memory of the processor may include a secure memory (not illustrated) which is not directly accessible by users or applications and that is capable of recording MDINs and SIMM IDs as described in the various embodiments. As part of the processor, such a secure memory may not be replaced or accessed without damaging or replacing the processor.

Additionally, the internal memory 802 may be a volatile or nonvolatile memory, such as flash memory, or a mixture of both. For the purposes of this description, a general reference to memory refers to all memory accessible by the processor 801, including internal memory 802, removable memory plugged into the computing device, and memory within the processor 801 itself, including the secure memory.

In an embodiment, additional memory chips (e.g., a Secure Data (SD) card) may be plugged into the wireless device 800 and coupled to the processor 801.

Figure 9:
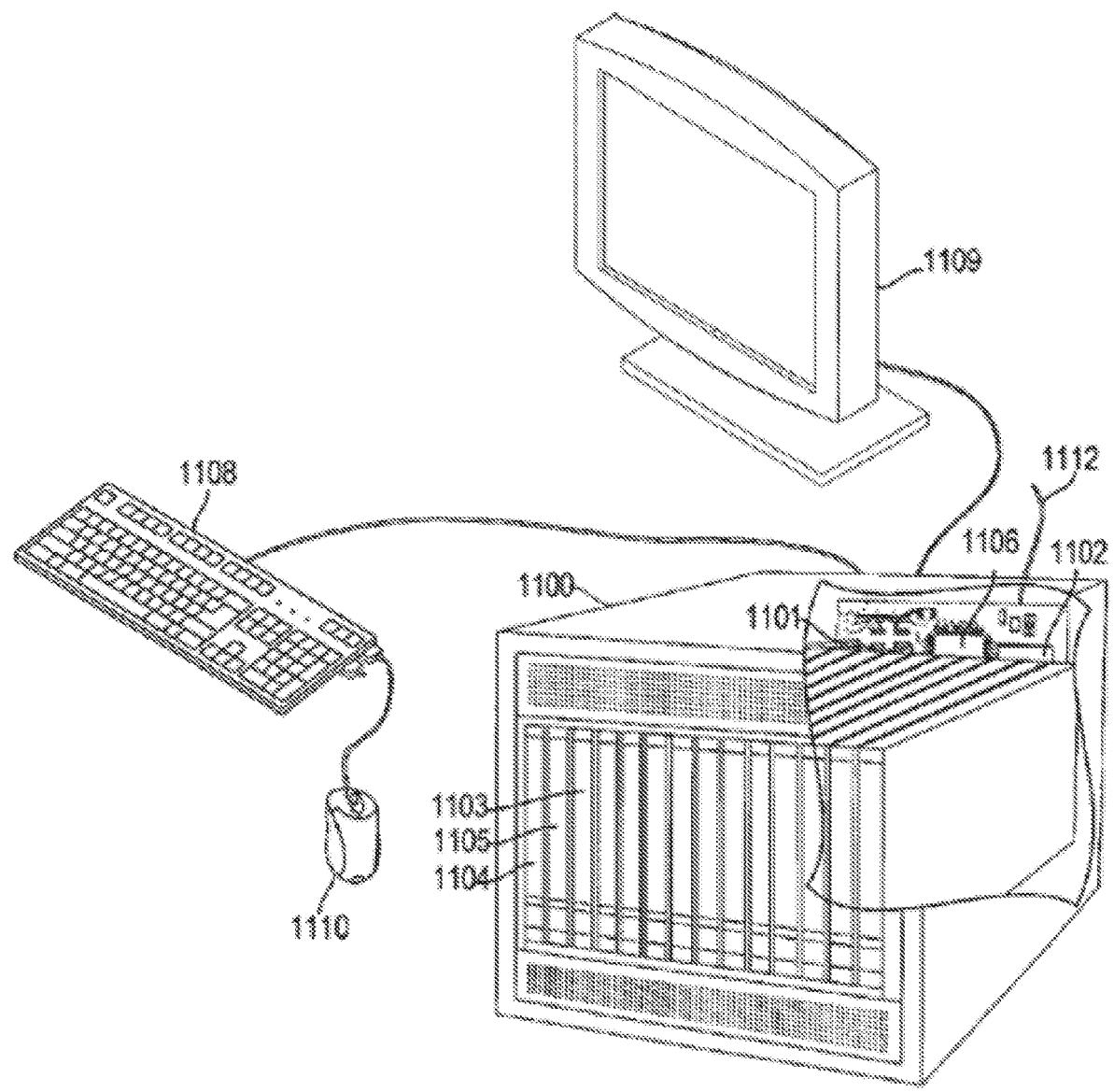
FIG. 9 illustrates a commercially available server device.

The various embodiments may also be implemented on any of a variety of commercially available server devices, such as the server 1100 illustrated in FIG. 9. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110), and a display 1109.

Existing wireless location monitoring systems generally use short range wireless technologies and operate by detecting nearby radio tags embedded in seating, tables or racks in the retail environment. These wireless locator devices relay the identifying information for the detected tag or tags to a correlating central processor to provide customer location information as opposed to using wireless receivers to detect the location of a wireless transmitter. This approach leads to several problems.

First, the wireless locator device must be intentionally placed by the customer within a very short distance, on the order of 1 inch, from the radio tag. If the customer is not informed of this required behavior, or otherwise fail to meet this requirement, the location tracking solution would not function properly.

Second, it is increasingly common to find retail locations equipped with movable seating, tables and product racks. As this furniture is moved in the venue, it becomes increasingly difficult to determine the customer's precise location simply based on the furniture's embedded radio tag.

The advantages of the present disclosure over the art are numerous, including providing a more precise method of tracking of the customer's location and a more efficient method of delivering products and services to a user. Further, the present technology may be implemented in a wide variety of ways according to a limitless array of potential embodiments. While the above description describes implementation of the present technology in a restaurant venue, this disclosure may also be applied in, but is not limited to, retail stores, stadiums, arenas, train stations, airports, and many other venues.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a location of a user in a physical venue to support delivery of a product/service, the method comprising:
receiving a signal from a wireless transmitter in a user's possession, the signal containing an unique identifier representative of an identifying number associated with the wireless transmitter and with an order placed by the user for the product/service on a separate ordering device;
determining a location of the wireless transmitter in the physical venue based on the unique identifier upon completion of preparation of the product/service; and
outputting the location and identifying number of the wireless transmitter on a receipt for the order to locate the user in possession of the wireless transmitter and to support the delivery of the product/service to the location.

2. The method of claim 1, wherein the signal from the wireless transmitter is transmitted by the wireless transmitter in response to a user request to order the product/service.

3. The method of claim 1, wherein the signal from the wireless transmitter is transmitted repeatedly by the wireless transmitter.

4. The method of claim 1, wherein the signal from the wireless transmitter is transmitted to one or more wireless receivers positioned at one or more locations in the physical venue, wherein the one or more wireless receivers then relays the signal to a central processor.

5. The method of claim 1, wherein the signal includes metadata having a timestamp of when the signal is received by a wireless receiver, the timestamp being generated by the wireless receiver and added to the signal's metadata.

6. The method of claim 1, wherein the signal includes metadata having a signal strength measure for the strength of the signal when it was received by a wireless receiver, the signal strength measure being generated by the wireless receiver and added to the signal's metadata.

7. The method of claim 1, wherein the wireless transmitter is a table tent.

8. The method of claim 1, wherein the wireless transmitter is a mobile device comprising software to transmit the signal to one or more wireless receivers.

9. The method of claim 1, further comprising:
transmitting the signal from the wireless transmitter to a first wireless receiver;
transmitting the signal from the first wireless receiver to a second wireless receiver; and
receiving the signal at a central processor from the second wireless receiver.

10. The method of claim 1, wherein the wireless transmitter is associated with the order of the product/service by the user.

11. The method of claim 1, wherein the receipt is a paper receipt or a visually displayed receipt through a physical display.

12. A device for determining a location of a user in a physical venue to support delivery of a product/service, comprising:
a non-transitory memory storage comprising instructions; and
one or more processors in communication with the memory, wherein the one or more processors execute the instructions to:
receive a signal from a wireless transmitter in a user's possession, the signal containing an unique identifier representative of an identifying number associated with the wireless transmitter and with an order placed by the user for the product/service on a separate ordering device;
determine a location of the wireless transmitter in the physical venue based on the unique identifier upon completion of preparation of the product/service; and
output the location and identifying number of the wireless transmitter on a receipt for the order to locate the user in possession of the wireless transmitter and to support the delivery of the product/service to the location.

13. The device of claim 12, wherein the signal from the wireless transmitter is transmitted by the wireless transmitter in response to a user request.

14. The device of claim 12, wherein the signal from the wireless transmitter is transmitted repeatedly by the wireless transmitter.

15. The device of claim 12, wherein the signal from the wireless transmitter is transmitted to one or more wireless receivers positioned at one or more locations in the physical venue, wherein the one or more wireless receivers then relays the signal to a central processor.

16. The device of claim 12, wherein the signal includes additional metadata having a timestamp of when the signal is received by a wireless receiver, the timestamp being generated by the wireless receiver and added to the signal's metadata.

17. The device of claim 12, wherein the signal includes additional metadata having a signal strength measure for the strength of the signal when it was received by a wireless receiver, the signal strength measure being generated by the wireless receiver and added to the signal's metadata.

18. The device of claim 12, wherein the wireless transmitter is a table tent.

19. The device of claim 12, wherein the wireless transmitter is a mobile device comprising software to transmit the signal to one or more wireless receivers.

20. The device of claim 12, further comprising:
transmit the signal from the wireless transmitter to a first wireless receiver;
transmit the signal from the first wireless receiver to a second wireless receiver; and
receive the signal at a central processor from the second wireless receiver.

21. A non-transitory computer-readable medium storing computer instructions for determining a location of a user in a physical venue, that when executed by one or more processors, cause the one or more processors to perform the steps of:
receive a signal from a wireless transmitter in a user's possession, the signal containing an unique identifier representative of an identifying number associated with the wireless transmitter and with an order placed by the user for the product/service on a separate ordering device;
determine a location of the wireless transmitter in the physical venue based on the unique identifier upon completion of preparation of the product/service; and
output the location and identifying number of the wireless transmitter on a receipt for the order to locate the user in possession of the wireless transmitter and to support the delivery of the product/service to the location.

22. The non-transitory computer-readable medium of claim 21, wherein the signal from the wireless transmitter is transmitted by the wireless transmitter in response to a user request.

23. The non-transitory computer-readable medium of claim 21, wherein the signal from the wireless transmitter is transmitted repeatedly by the wireless transmitter.

24. The non-transitory computer-readable medium of claim 21, wherein the signal from the wireless transmitter is transmitted to one or more wireless receivers positioned at one or more locations in the physical venue, wherein the one or more wireless receivers then relay the signal to a central processor.

25. The non-transitory computer-readable medium of claim 21, wherein the signal includes additional metadata having a timestamp of when the signal is received by a wireless receiver, the timestamp being generated by the wireless receiver and added to the signal's metadata.

26. The non-transitory computer-readable medium of claim 21, wherein the signal includes additional metadata having a signal strength measure for the strength of the signal when it was received by a wireless receiver, the signal strength measure being generated by the wireless receiver and added to the signal's metadata.

* * * * *